(12) United States Patent
Roos et al.

(10) Patent No.: US 11,819,035 B2
(45) Date of Patent: Nov. 21, 2023

(54) EVERSION DEVICE AND SMALL INTESTINE PROCESSING LINE

(71) Applicant: MAREL BRASIL COMERCIAL E INDUSTRIAL LTDA, Guapore (BR)

(72) Inventors: Henrique Roos, Guapore (BR);
Roberto Dill Paula, Guapore (BR);
Eder Brambatti, Guapore (BR);
Adalberto Klose, Guapore (BR)

(73) Assignee: MAREL BRASIL COMERCIAL E INDUSTRIAL LTDA, Guapore (BR)

( * ) Notice: Subject to any disclaimer, the term of this patent is extended or adjusted under 35 U.S.C. 154(b) by 0 days.

(21) Appl. No.: 17/919,148

(22) PCT Filed: Apr. 21, 2021

(86) PCT No.: PCT/BR2021/050166
§ 371 (c)(1),
(2) Date: Oct. 14, 2022

(87) PCT Pub. No.: WO2021/212195
PCT Pub. Date: Oct. 28, 2021

(65) Prior Publication Data
US 2023/0117481 A1    Apr. 20, 2023

(30) Foreign Application Priority Data

Apr. 24, 2020 (BR) ...................... 10 2020 008212-4

(51) Int. Cl.
*A22C 17/16* (2006.01)

(52) U.S. Cl.
CPC .................... *A22C 17/16* (2013.01)

(58) Field of Classification Search
CPC ................. A22C 17/16; A22C 17/14
(Continued)

(56) References Cited

U.S. PATENT DOCUMENTS 2,037,253 A    4/1936  Middaugh
2,231,954 A *  2/1941  Scherubel ............. A22C 17/14
                                                    493/308
(Continued)

FOREIGN PATENT DOCUMENTS

JP    2004261069 A    9/2004
KR   20150114776 A   10/2015
(Continued)

OTHER PUBLICATIONS

International Search Report from corresponding PCT Application No. PCT/BR2021/050166, dated Sep. 14, 2021.

*Primary Examiner* — Richard T Price, Jr.
(74) *Attorney, Agent, or Firm* — WORKMAN NYDEGGER

(57) ABSTRACT

An eversion device for small intestine eversion and a small intestine processing line, includes a water tank formed by walls, has a first side wall and a second side wall. The eversion device includes at least one conveyor assembly arranged in one of the side walls of the tank. The conveyor assembly is configured to transport at least one small intestine along the side wall, and the tank is configured to overflow water over at least one part of an upper edge of the side wall that receives the conveyor assembly. A small intestine processing line has the aforementioned eversion device and includes at least one stool removal device with a way to feed small intestines to the tank of the eversion device, and at least one mucosa removal device arranged posteriorly to the tank of the eversion device.

15 Claims, 8 Drawing Sheets

(58) Field of Classification Search
USPC .......................................................... 452/106
See application file for complete search history.

(56) References Cited

U.S. PATENT DOCUMENTS

| | | |
|---|---|---|
| 2,239,199 A | 4/1941 | Pulley |
| 2,726,421 A | 12/1955 | Strickler |
| 4,306,333 A * | 12/1981 | DeLong ................. A22C 17/16 |
| | | 452/111 |

FOREIGN PATENT DOCUMENTS

| | | |
|---|---|---|
| SU | 888900 A1 | 12/1981 |
| WO | 2008121839 A1 | 10/2008 |

* cited by examiner

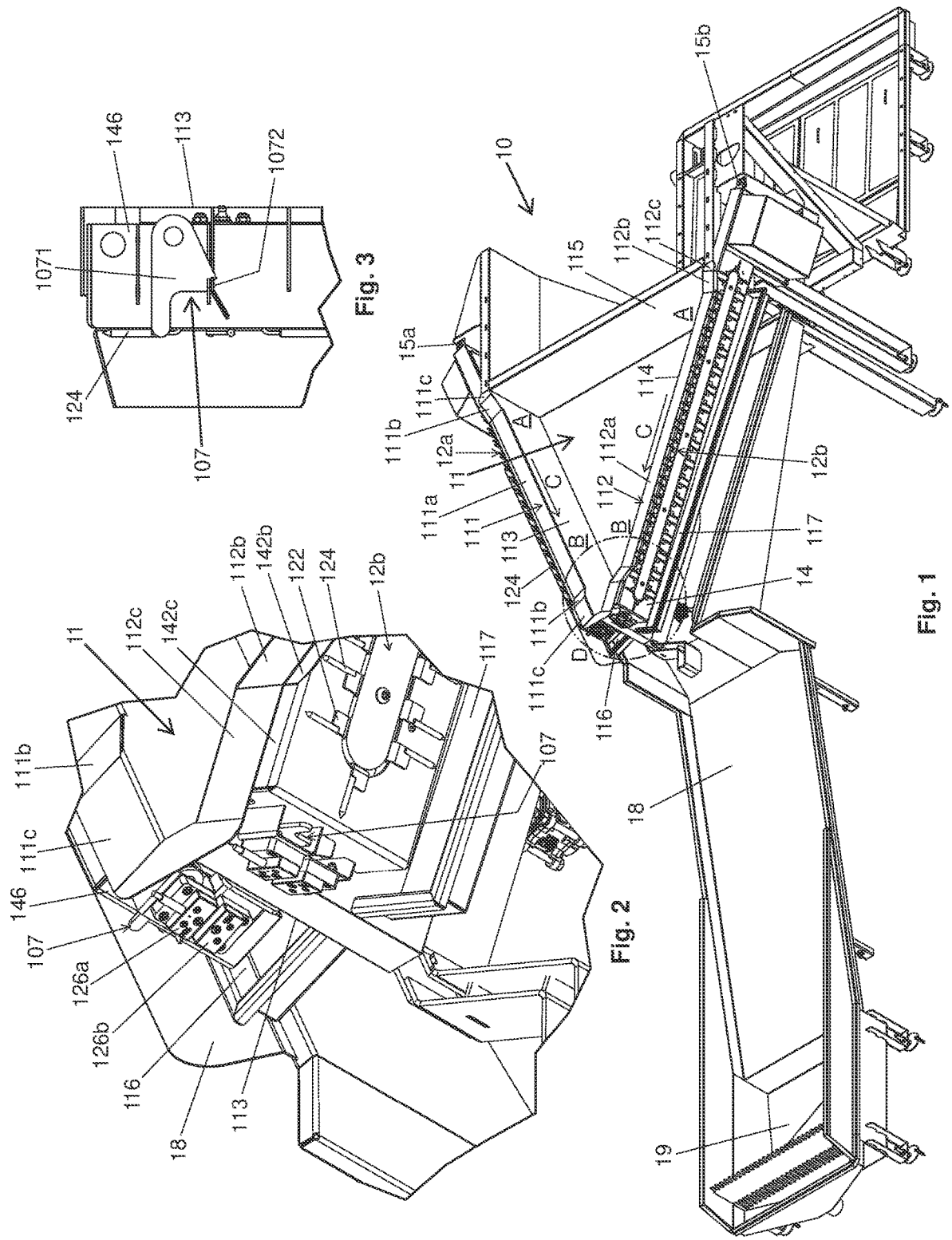

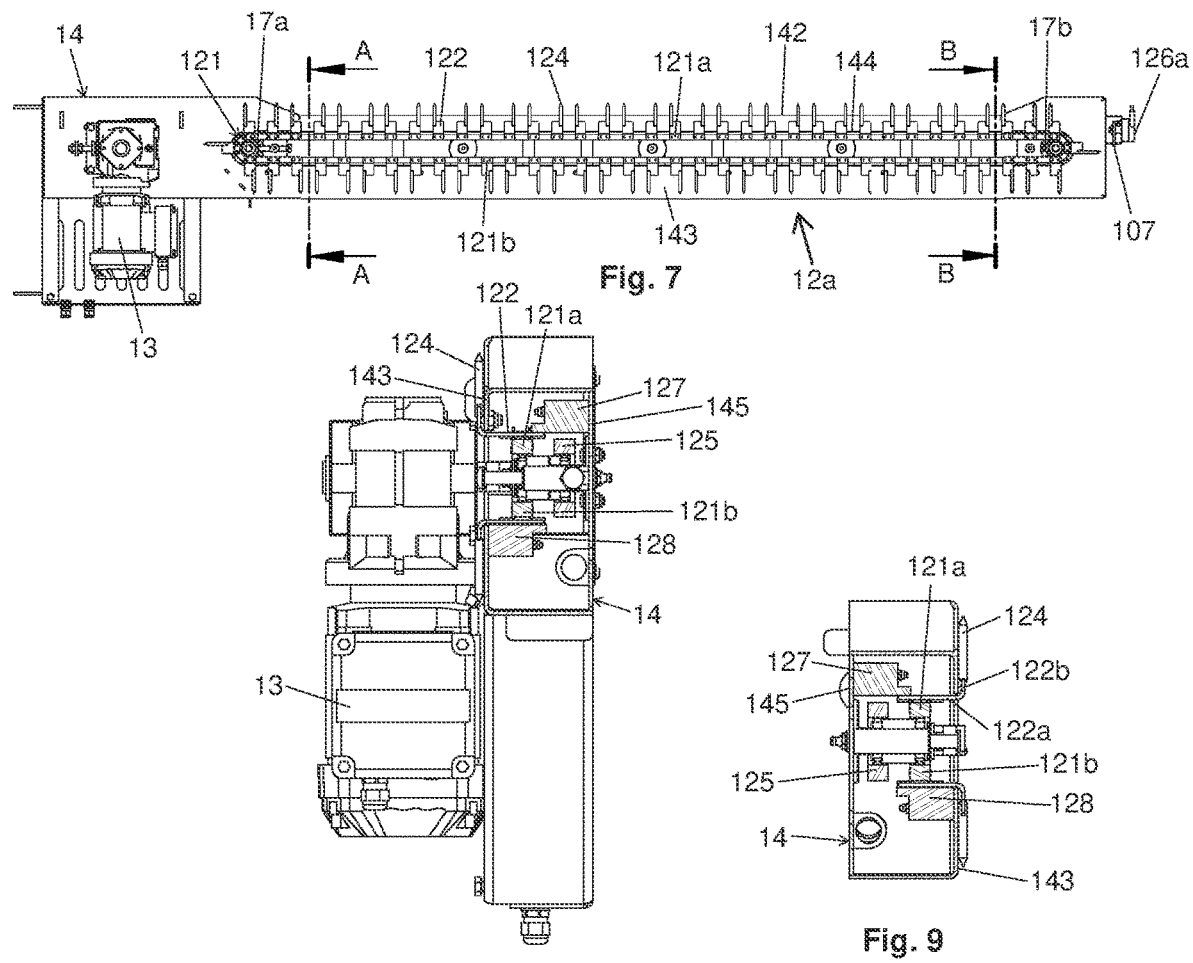
Fig. 7
Fig. 8
Fig. 9
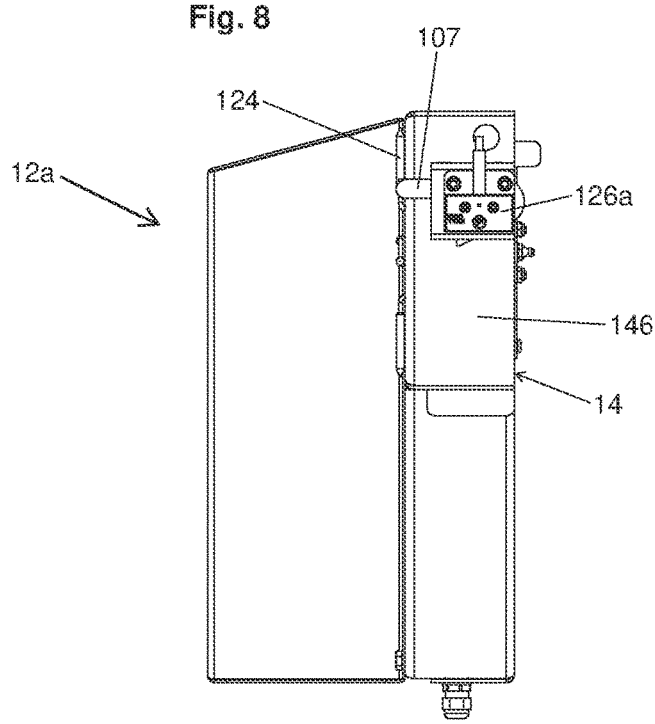
Fig. 10

EVERSION DEVICE AND SMALL INTESTINE PROCESSING LINE

TECHNICAL FIELD

The invention relates to an eversion device for small intestine eversion and a small intestine processing line comprising the said eversion device, more specifically for the processing of small intestines of slaughtered cattle.

PRIOR ART

In the meat industry, the small intestine of slaughtered cattle is processed in order to create a casing, which is used in the manufacture of embedded foods. At the beginning of processing, the small intestine is attached to a viscera package through a membrane called the mesentery. In a conventional small intestine processing line, the first step is to separate the small intestine from the viscera package. Commonly, this step is performed by an operator using a pulling device, which pulls the small intestine, while the operator performs the cutting of the mesentery with a cutting device, in order to continuously separate the small intestine in the direction of moving it away from the viscera package. At the end of this stage, the small intestine is configured as a line of approximately 30 meters.

After the pulling device, the small intestine is introduced in at least one stool removal device provided with a pair of cooperating rollers, which compress the small intestine in order to remove the stool present inside it. After passing through the stool removal device, the small intestine is formed by the casing and a layer of mucosa adhered to the inner wall of the casing. Following a conventional processing line, the small intestine is introduced into a water tank and guided to at least one primary mucosa removal device, which comprises a pair of cooperating rollers that compress the small intestine to remove this mucosa from inside of said small intestine, the mucosa being conducted into the water tank.

Subsequently, after passing through the primary mucosa removal device, the small intestine is guided to an eversion device. A conventional eversion device comprises a water tank, commonly, from the perspective of a top view, rectangular, having an inlet wall facing the primary mucosa removal device and an outlet wall opposite the inlet wall, said walls cooperating with a first and a second side wall. In addition, the water tank comprises a plurality of pins fixed to the upper end of the outlet wall.

More specifically, after passing through the primary mucosa removal device, the small intestine is guided into the water tank. To perform an eversion procedure of the small intestine, an operator, positioned close to the outlet wall of the water tank, folds one end of the small intestine, in order to create a folded portion in which the inner wall of the small intestine is exposed to the outside, and pierces the folded portion through two adjacent pins, in order to secure the small intestine in said pins. The tank is configured to overflow water over the upper end of the outlet wall where the pins are located, so that part of the water enters the folded portion of the small intestine fixed in said pins and forces the rest of the small intestine submerged in the tank to be continuously turned from the inside out, until the inner wall of the small intestine is fully exposed to the outside and the small intestine is completely outside the tank. Thus, an everted small intestine is obtained.

Additionally, in a conventional processing line, the everted small intestine passes through a secondary mucosa removal device. For this purpose, the operator detaches the everted small intestine from the pins of the eversion device and inserts said everted small intestine in the secondary mucosa removal device, arranged in front of the outlet wall of the water tank of the eversion device. The secondary mucosa removal device comprises a pair of cooperating scraper rollers that scrape the remaining mucosa from the small intestine, resulting in a mucosa-free casing.

However, the conventional processing line has drawbacks related to the low productivity of processing small intestines achieved. More specifically, the conventional eversion device requires a laborious and time-consuming eversion procedure. In addition, after removing the small intestine from the pins on the tank outlet wall of the conventional eversion device, the operator must turn half a turn around its own axis to then introduce the small intestine into the secondary mucosa removal device, which turns out to be tiring and exhausting, considering that this task must be repeated several times during a work shift.

SUMMARY OF THE INVENTION

In order to solve the drawbacks, present in the prior art, the invention proposes an eversion device for everting small intestine, the eversion device comprising a water tank formed by walls, including a first side wall and a second side wall. According to the invention, the eversion device comprises at least one conveyor assembly arranged in one of the side walls of the tank, said conveyor assembly configured to transport at least one small intestine along said side wall, and the tank configured to overflow water over at least one part of an upper edge of the side wall that receives the conveyor assembly.

In addition, the invention proposes a small intestine processing line comprising the eversion device as proposed by the invention, said processing line comprising at least one stool removal device having means to feed small intestines to the tank of the eversion device, and at least one mucosa removal device arranged posteriorly to the tank of the eversion device.

Advantageously, the eversion device proposed by the invention allows to achieve an organized work regime. More particularly, the conveyor assembly of the eversion device makes it possible to process multiple small intestines simultaneously, following a processing order that is easy to define and execute. Advantageously, the eversion device and the processing line proposed by the invention make it possible to considerably increase the productivity of processing small intestines. In addition, since the eversion procedure is performed by an operator in front of the side wall of the tank, advantageously, an operation to remove the small intestine from the conveyor assembly and feed the small intestine to the mucosa removal device is performed by the operator according to a substantially linear movement, without the operator having to rotate around its own axis, which contributes significantly to the operator's ergonomics.

BRIEF DESCRIPTION OF THE FIGURES

The invention will be better understood with the following detailed description, which will best be interpreted when using the figures, namely:

FIG. 1 shows a perspective view of an eversion device according to the invention.

FIG. 2 presents an enlarged view of the "D" region indicated in FIG. 1.

FIG. 3 shows a sectional view of a locking device of a casing of a conveyor assembly.

FIG. 7 shows a front view of the conveyor assembly, wherein a protection plate of a roller chain is hidden.

FIG. 8 shows a sectional view according to the "A-A" cutting plane indicated in FIG. 7.

FIG. 9 shows a sectional view according to the "B-B" cutting plane indicated in FIG. 7.

FIG. 10 shows a side view of the conveyor assembly.

DETAILED DESCRIPTION

Figure 4:
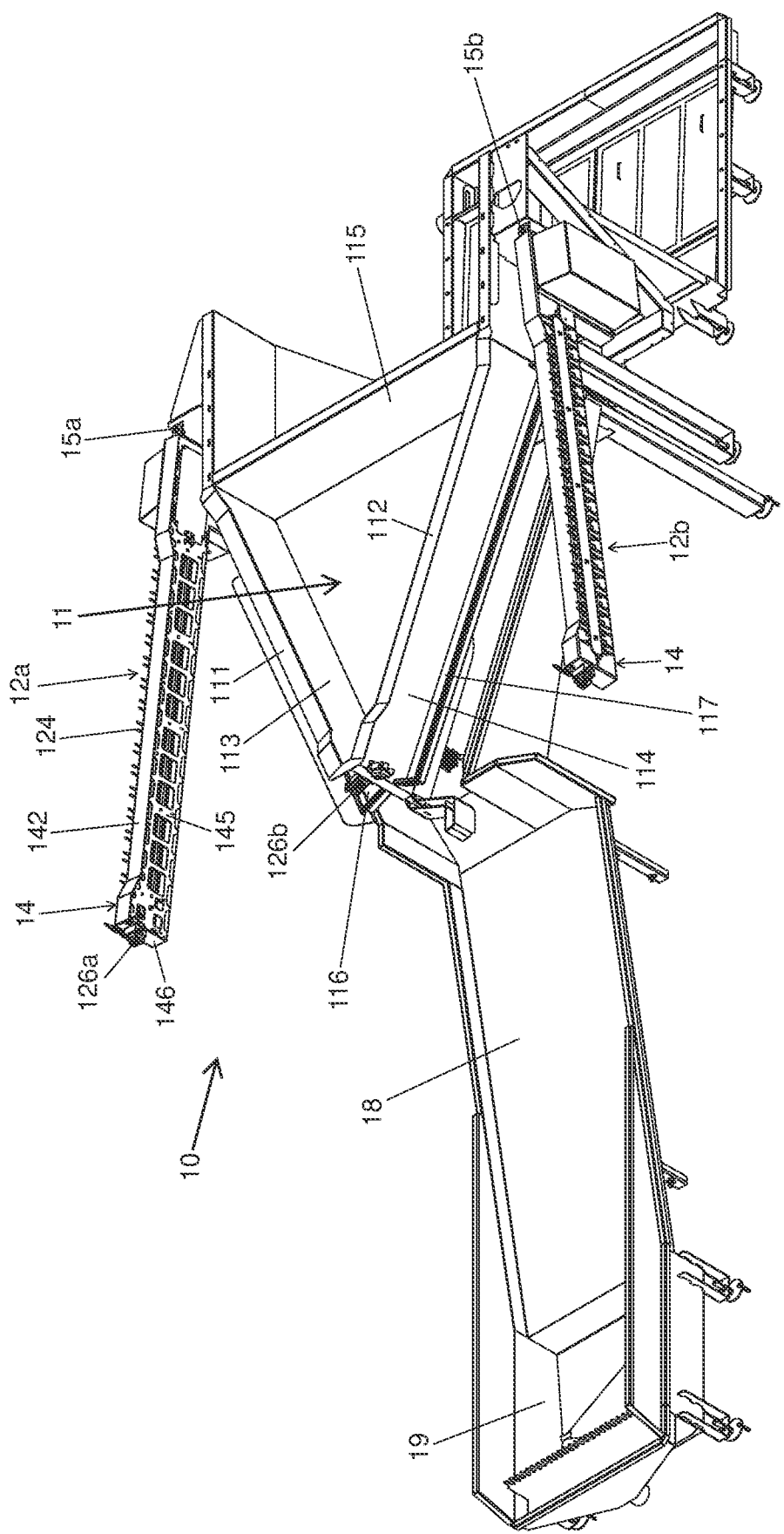
FIG. 4 shows another perspective view of the eversion device, wherein a first and a second conveyor assembly are in an open position.
Figure 6:
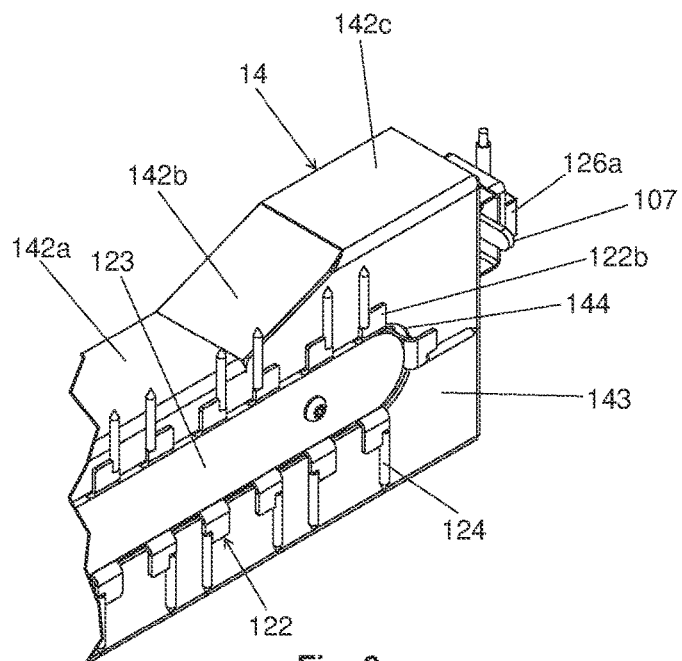
FIG. 6 presents an enlarged view of the "A" region indicated in FIG. 5.

As can be seen in FIG. 1, the eversion device (10) proposed by the invention comprises a water tank (11) formed by walls, including a first side wall (113) and a second side wall (114). According to the invention, the eversion device (10) comprises at least one conveyor assembly (12a, 12b) arranged in one of the side walls (113, 114) of the tank (11), said conveyor assembly (12a, 12b) configured to transport at least one small intestine along said side wall (113, 114), and the tank (11) configured to overflow water over at least one part of an upper edge (111, 112) of the side wall (113, 114) that receives the conveyor assembly (12a, 12b).

In front of the conveyor assembly (12a, 12b) a working region is defined for an operator to perform a small intestine eversion procedure. In work, the tank (11) receives small intestines from a previous stage of a processing line. First, the operator performs an operation of inserting a first small intestine into the conveyor assembly (12a, 12b), which consists of folding one end of the first small intestine, in order to create a folded portion in which the inner wall of the small intestine is exposed to the outside and attach this folded portion to the conveyor assembly (12a, 12b). In the embodiment shown, the insertion operation can be carried out in the vicinity of a starting region "A" illustrated in FIG. 1.

Then, a transport and eversion operation take place, in which the conveyor assembly (12a, 12b) moves said small intestine along the side wall (113, 114) in order to transport it to a destination region "B" corresponding to a region of the tank (11) closest to a later stage of the processing line. In the embodiment shown, the direction of transport is indicated by the "C" arrow illustrated in FIG. 1. As the first small intestine is moved by the conveyor assembly (12a, 12b), water that overflows over the side wall (113, 114) enters the folded portion of the intestine and forces the rest of the small intestine submerged in the tank (11) to be continuously turned from the inside out, until the inner wall of the small intestine is fully exposed to the outside and the small intestine is completely outside the tank (11). Thus, a first everted small intestine is obtained located in the destination region "B". When the first everted small intestine is in destination region "B", the operator performs a removal operation in which the operator removes the first everted small intestine from the conveyor assembly (12a, 12b) and feeds the everted small intestine at a later stage of the processing line.

In practice, the operator can work with several small intestines simultaneously. For example, right after the operator inserts the first small intestine into the conveyor assembly (12a, 12b), the operator can now insert a second small intestine and then a third small intestine and a fourth small intestine. After the transport and eversion of the small intestines, the operator performs the successive removal from the first to the fourth everted small intestine. For example, a work regime of four insertions followed by four withdrawals allows good productivity to be achieved. Alternatively, a first operator can dedicate himself exclusively to the insertion operation, while a second operator dedicates himself exclusively to the withdrawal operation.

Advantageously, the eversion device (10) proposed by the invention allows to achieve an organized work regime, with insertion and removal operations following an order of easy definition and execution, which contributes to considerably increase the productivity of processing small intestines in relation to eversion devices known in the state of the art. In addition, as the eversion procedure is performed in front of the side wall (113, 114) of the tank (11), advantageously, the small intestine removal operation from the conveyor assembly (12a, 12b) and feeding the small intestine to the later stage of the processing line is carried out by the operator according to a substantially linear movement, without the operator having to rotate around its own axis, which contributes significantly to the operator's ergonomics.

Preferably, the eversion device (10) comprises a first conveyor assembly (12a) arranged in the first side wall (113) of the tank (11) and a second conveyor assembly (12b) arranged in the second side wall (114) of the tank (11). Thus, a first working region is defined in front of the first conveyor assembly (12a) for a first operator to perform the eversion procedures, and a second working region in front of the second conveyor assembly (12b) for a second operator to perform the eversion procedures, which results in a considerable increase in the productivity of processing small intestines.

Preferably, from the perspective of a top view, the tank (11) has a triangular shape, including a base wall (115) cooperating with the side walls (113, 114), said side walls (113, 114) converging to a vertex. The triangular shape of the tank (11) allows the destination regions "B" of each conveyor assembly (12a, 12b) to converge in the vicinity of the vertex, which, advantageously, facilitates the feeding of the small intestine to a later stage of the processing line. In addition, the triangular shape of the tank (11) allows a work regime with three operators, wherein a first operator is responsible for dedicating himself exclusively to the small intestine insertion operation in the first conveyor assembly (12a), a second operator is responsible for dedicating himself exclusively to the operation of insertion of small intestine in the second conveyor assembly (12b), and a third operator is responsible for dedicating himself exclusively to the small intestine removal operation from both conveyor assemblies (12a, 12b). The choice of a work regime with two or three operators may vary according to the desired productivity and the degree of expertise of the operators. Alternatively, from the perspective of a top view, the tank (11) can have other shapes, such as, for example, a rectangular, square or trapezoidal shape. These shapes allow achieving work regimes with 2 to 4 operators.

Preferably, each conveyor assembly (12a, 12b) comprises a respective plurality of pins (124) spaced apart, said pins (124) being movable along the respective side wall (113, 114) of the tank (11). A pair of pins (124) is used to secure the folded portion of a small intestine to the conveyor assembly (12a, 12b). More particularly, during the insertion operation, the operator pierces the folded portion through a pair of pins (124) in order to retain the folded portion on the pair of pins (124). Preferably, as can be best seen in FIG. 5, the pins (124) are arranged so that the distance of a particular pin (124) from the adjacent pin (124) of the same pair of pins (124) is less than the distance of this particular pin (124) from another adjacent pin (124) belonging to an adjacent pair of pins (124). The distance between pins (124) of the same pair of pins (124) is compatible with the diameter of the small intestines to be processed, in order to allow the retention of a small intestine in a respective pair of pins (124). For example, the distance between pins (124) of the same pair of pins (124) can be between 25 and 55 mm, preferably between 30 and 40 mm. Alternatively, the pins (124) can be arranged at a fixed spacing between adjacent pins (124). For example, the fixed spacing between pins (124) can be between 25 and 55 mm, preferably between 30 and 40 mm.

Alternatively, each conveyor assembly (12a, 12b) may comprise another type of retention device, instead of pins (124), which makes it possible to attach the folded portion of the small intestine to the conveyor assembly (12a, 12b), and which makes it possible to carry out the operation of transport and eversion of the small intestine, such as, for example, hooks or claws.

In the embodiment shown, as shown in FIGS. 1 and 2, the part of each upper edge (111, 112) of the tank (11) that allows water to overflow corresponds to a central recessed portion (111a, 112a) defined between inclined portions (111b, 112b) that project from the respective upper portions (111c, 112c).

Preferably, as can be seen in FIGS. 5 to 9 and 14, each conveyor assembly (12a, 12b) comprises a roller chain (121) having a transport portion (121a) and a return portion (121b), said roller chain (121) having a plurality of supports (122), each support (122) receiving at least one pin (124).

More specifically, the transport portion (121a) of the roller chain (121) is the portion in which the pins (124) receive the small intestine and transport it from the starting region "A" to the destination region "B" of the tank (11). On the other hand, the return portion (121b) is the portion in which the pins (124) are moved from the destination region "B" to the starting region "A", in order to receive other small intestines. In the embodiment shown, the roller chain (121) is a roller chain with attachments of the bilateral plate type, to which the supports (122) of the pins (124) are attached.

Preferably, each conveyor assembly (12a, 12b) comprises a casing (14) formed by walls that define a substantially rectangular prism shape, including a front wall (143), a rear wall (145) and an upper wall (142). As can be seen in FIGS. 8 and 9, the roller chain (121) is housed inside the casing (14). Each support (122) comprises a horizontal portion (122a) which is fixed to a respective attachment of the roller chain (121) and which extends through an opening (144) present in the front wall (143) of the casing (14), as it can also be seen in FIG. 6, and a vertical portion (122b) extended from the horizontal portion (122a), the vertical portion (122b) receiving the respective pin (124). In addition, each conveyor assembly (12a, 12b) comprises a protection plate (123) partially arranged over the opening (144) of the front wall (143) in order to define a gap between an edge of the opening (144) and an edge of the protection plate (123) sufficient for the displacement of the supports (122) during the activation of each conveyor assembly (12a, 12b). The protection plate (123) is fixed inside the casing (14).

Figure 5:
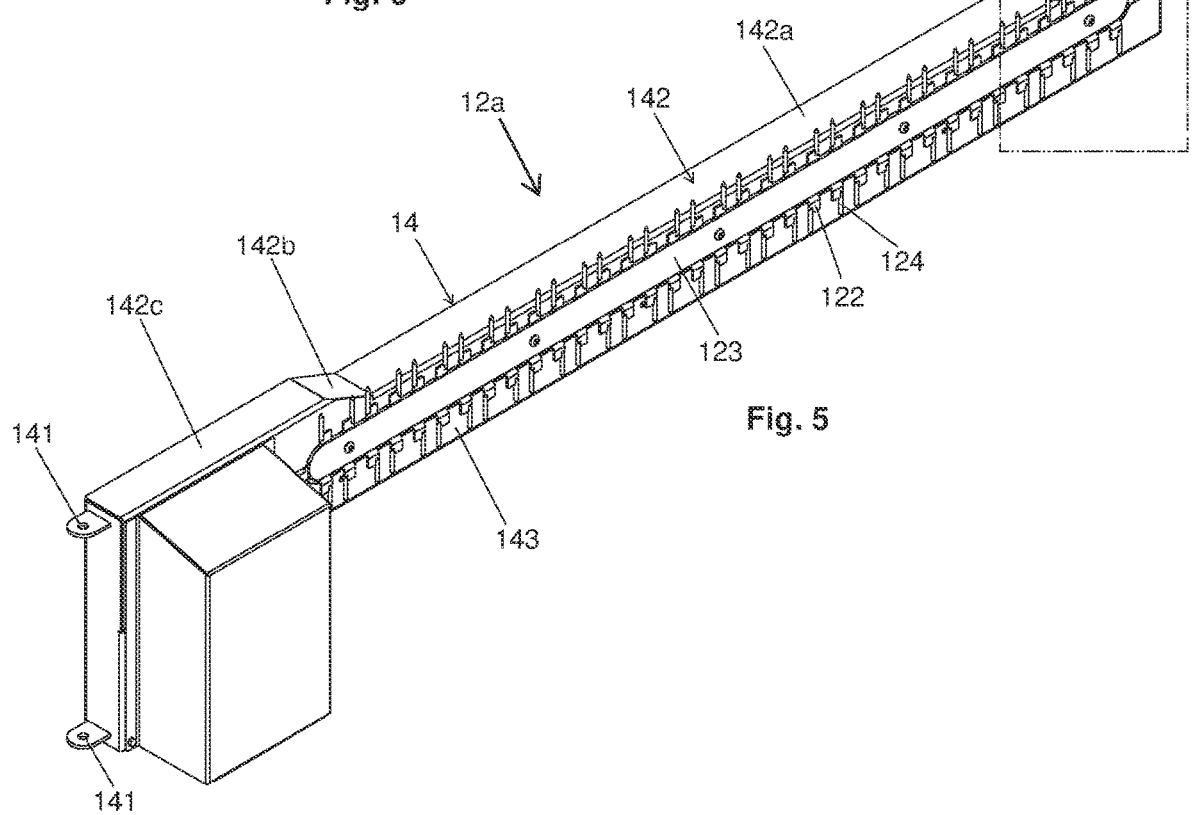
FIG. 5 shows a perspective view of a conveyor assembly of the eversion device.
Figure 11:
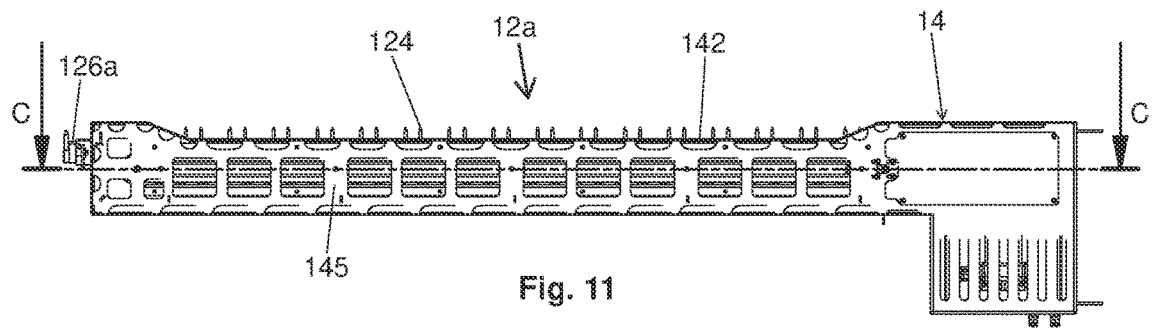
FIG. 11 shows a rear view of the conveyor assembly.

Preferably, the upper wall (142) of the casing (14) of each conveyor assembly (12a, 12b) has an appropriate profile for the casing (14) of each conveyor assembly (12a, 12b) to fit under the upper edge (111, 112) of the respective side wall (113, 114) of the tank (11), as shown in FIG. 1. More particularly, as can be seen in FIG. 5, the upper wall (142) of the casing (14) of each conveyor assembly (12a, 12b) has a central recessed portion (142a) defined between inclined portions (142b) that project from the respective upper portions (142c). The working region of each conveyor assembly (12a, 12b) corresponds to a region coinciding with the respective recessed portion (111a, 112a) of the upper edge (111, 112) of each side wall (113, 114) of the tank (11). Preferably, the pins (124) are arranged in a projecting manner in relation to the respective recessed portion (111a, 112a) of the upper edge (111, 112) of each side wall (113, 114) of the tank (11), allowing to perform the small intestine eversion procedure.

In the embodiment shown, each conveyor assembly (12a, 12b) comprises an upper guide (127) fixed internally to the rear wall (145) of the casing (14) and a lower guide (128) fixed internally to the front wall (143) of the casing (14) in order to assist in the support and stabilization of the roller chain (121). More specifically, the upper guide (127) is cooperative with the supports (122) that move in the transport portion (121a) of the roller chain (121) and the lower guide (128) is cooperative with the supports (122) that move in the return portion (121b) of the roller chain (121), as can best be seen in FIGS. 8 and 9. For example, the guides (127, 128) are made of high-density polyethylene.

Preferably, the drive of the roller chain (121) of each conveyor assembly (12a, 12b) is carried out by a motor reducer (13) fixed externally to the casing (14) and provided with an output shaft (131) passing through the front wall (143) of said casing (14). In the embodiment shown, the motor reducer (13) is equipped with an electric motor. Alternatively, the roller chain (121) can be driven by another type of motor, such as, for example, hydraulic or pneumatic.

Figure 12:
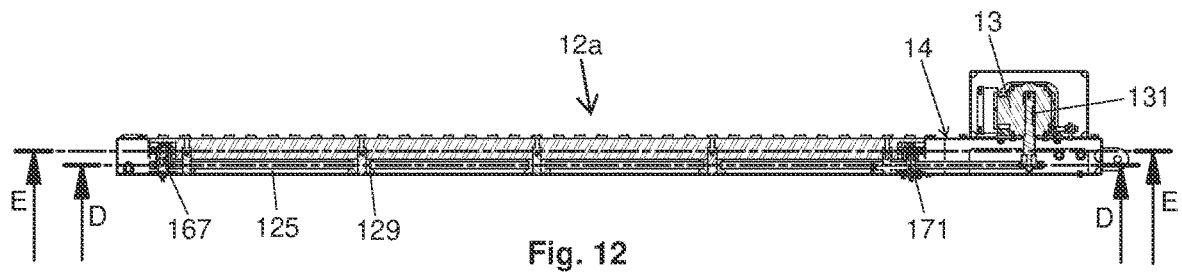
FIG. 12 shows a sectional view according to the "C-C" cutting plane indicated in FIG. 11.
Figure 13:
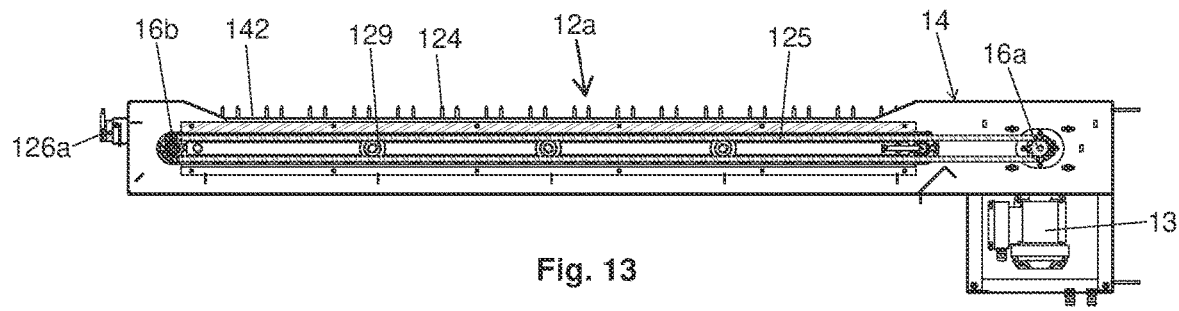
FIG. 13 shows a sectional view according to the "D-D" cutting plane indicated in FIG. 12.
Figure 14:
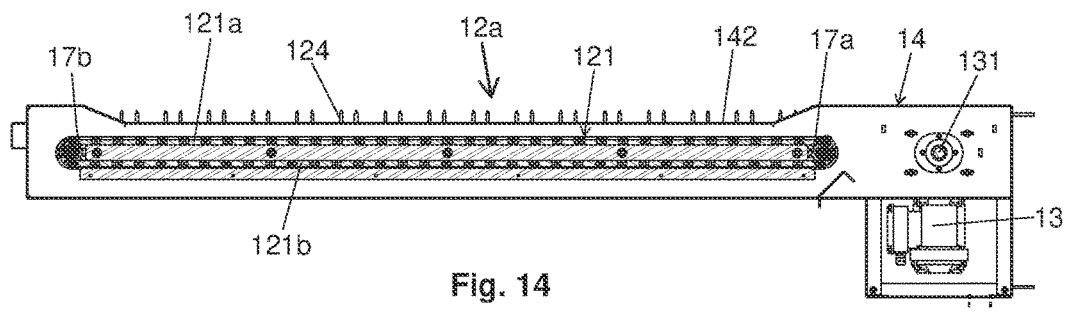
FIG. 14 shows a sectional view according to the "E-E" cutting plane indicated in FIG. 12.

Preferably, the drive of the roller chain (121) is carried out by a drive system comprising a first pair of sprockets provided with a front sprocket (16a) and a rear sprocket (16b), in which a drive chain (125) is coupled, and a second pair of sprockets provided with a front sprocket (17a) and a rear sprocket (17b), the roller chain (121) being coupled to the second pair of sprockets. As can be seen in FIGS. 12 to 14, the front sprocket (16a) of the first pair of sprockets is coupled to the output shaft (131) and transmits the movement of said shaft (131) to the respective rear sprocket (16b) through the drive chain (125). In turn, the rear sprocket (16b) of the first pair of sprockets is cooperative with the rear sprocket (17b) of the second pair of sprockets through a drive shaft (167), allowing the transmission of movement to the second pair of sprockets, and, consequently, to the roller chain (121). The front sprocket (17a) of the second pair of sprockets is mounted on a support shaft (171). Also, in the embodiment shown, the drive chain (125) slides on support rollers (129) installed in the casing (14) in a spaced manner along the path of the drive chain (125). The drive system can be equipped with tensioning sets in order to allow an adjustment in the tensioning of the chains (121, 125). Alternatively, the drive system can be configured directly, eliminating the use of the drive chain (125). In this case, the output shaft (131) can be connected directly to the roller chain (121) with the aid of a pair of sprockets.

Each conveyor assembly (12a, 12b) can be configured to develop a linear speed in each roller chain (121), ranging from 0.4 to 1.5 m/min, more particularly ranging from 0.5 to 0.7 m/min, which allows achieving good processing productivity, when working with small intestines of approximately 30 meters. However, the appropriate linear speed for the displacement of the roller chain (121) can vary according to the processing conditions, for example, in the case of working with sections of small intestines of approximately 10 meters or 20 meters, and also according to the degree of expertise of the operator. Optionally, each conveyor assembly (12a, 12b) is equipped with means to regulate the travel speed of the respective roller chain (121), such as a speed regulator switch associated with a frequency inverter, in order to make it possible to regulate the travel speed of each roller chain (121) according to the current working condition.

Preferably, each conveyor assembly (12a, 12b) is pivotable in relation to the respective side wall (113, 114) of the tank (11) by means of a respective pivoting pin (15a, 15b). More particularly, as can be seen in FIGS. 1, 4 and 5, each conveyor assembly (12a, 12b) receives a respective pair of pivoting pins (15a, 15b) through a pair of flaps with holes (141) located in the casing (14), the pair of holes (141) cooperating with another pair of holes arranged in a pair of flaps present in a fixation region in the tank (11). By articulating the conveyor assemblies (12a, 12b) in an open position, as illustrated in FIG. 4, it is possible to carry out any cleaning or maintenance on said conveyor assemblies (12a, 12b). Particularly for this purpose, the rear wall (145) of each casing (14) can be configured with a plurality of openings, as can be seen in FIG. 4, which give access to the inner region of the casing (14), without requiring disassembly operations.

Preferably, each conveyor assembly (12a, 12b) comprises a locking device (107) which in a locked position holds the respective conveyor assembly (12a, 12b) in a closed position next to the respective side wall (113, 114) of the tank (11), and in the unlocked position, it allows to change the respective conveyor assembly (12a, 12b) to the open position. In the embodiment shown, as can be better seen in FIGS. 2 and 3, each locking device (107) comprises a lock (1071) pivoting on a side wall (146) of the casing (14), the lock (1071) being fittable in a receptacle present in a locking plate (1072) fixed to the respective side wall (113, 114) of the tank (11).

Preferably, each conveyor assembly (12a, 12b) comprises a safety sensor (126a) and a sensor actuator (126b) arranged in such a way that when the respective conveyor assembly (12a, 12b) is in a closed position, the sensor (126a) detects the presence of the actuator (126b). In the embodiment shown, as shown in FIG. 2, the sensor (126a) is attached to the respective side wall (146) of the casing (14) and the sensor actuator (126b) is attached to the respective side wall (113, 114) of the tank (11). During the movement of the conveyor assembly (12a, 12b) to the open position, the sensor (126a) is moved away from the sensor actuator (126b), which ends up deactivating the sensor (126a), which in turn interrupts the power supply to the motor of the motor reducer (13), turning it off. Thus, advantageously, the movement of the roller chains (121, 125) is automatically switched off by opening a conveyor assembly (12a, 12b), protecting the operator against an eventual accident, in case the operator forgets to stop the motor through a start button. For example, the sensor and actuator assembly (126a, 126b) are electromagnetic type.

Preferably, the eversion device (10) comprises a lower gutter (18) arranged below the tank (11) and extended to a lower water tank (19). Advantageously, the everted portion of small intestines that are being processed in the eversion device (10) falls into the lower gutter (18) and slides into the lower water tank (19), which allows the accommodation of several small intestines without them curling up in each other.

Preferably, at least one of the side walls (113, 114) of the water tank (11) comprises a water collection gutter (116, 117) which extends along the said side wall (113, 114). In the embodiment shown, each side wall (113, 114) of the tank (11) comprises a respective water collection gutter (116, 117). More specifically, the water that overflows from the tank (11) falls into the water collection gutters (116, 117) and is reintroduced into the tank (11) through a recirculation system equipped with pipes, pumps, valves, supply and outlet water, among other hydraulic equipment known in the state of the art. Preferably, before being reintroduced into the tank (11), the water undergoes a flotation process, responsible for removing the fat from the small intestines.

The invention further proposes a small intestine processing line (100) comprising an eversion device (10) as proposed by the invention, and comprising at least one stool removal device (20, 30) having means to feed small intestines to the tank (11) of the eversion device (10), and at least one mucosa removal device (40, 50, 60) arranged posteriorly to the tank (11) of the eversion device (10).

Figure 15:
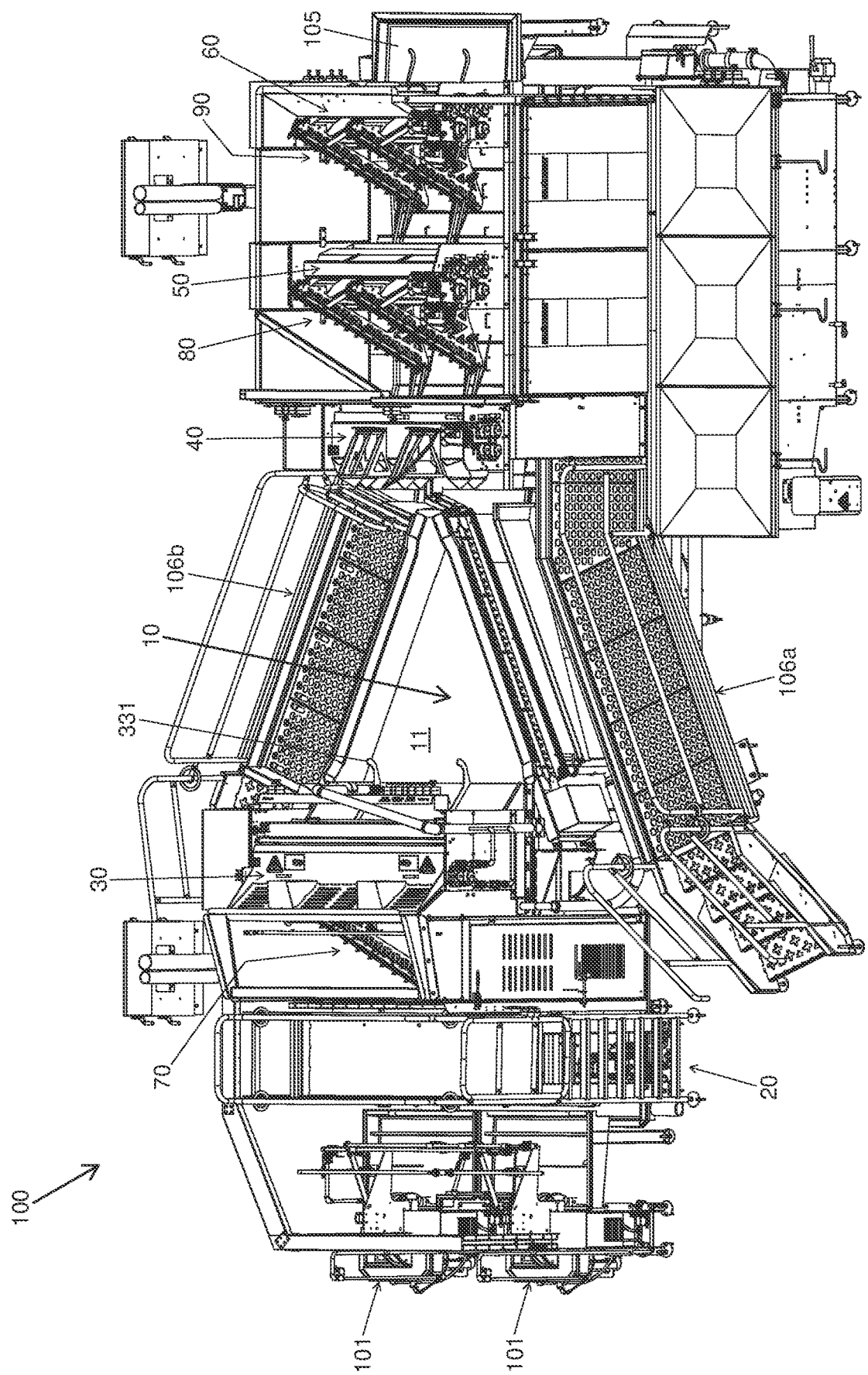
FIG. 15 shows a perspective view of a small intestine processing line according to the invention.
Figure 16:
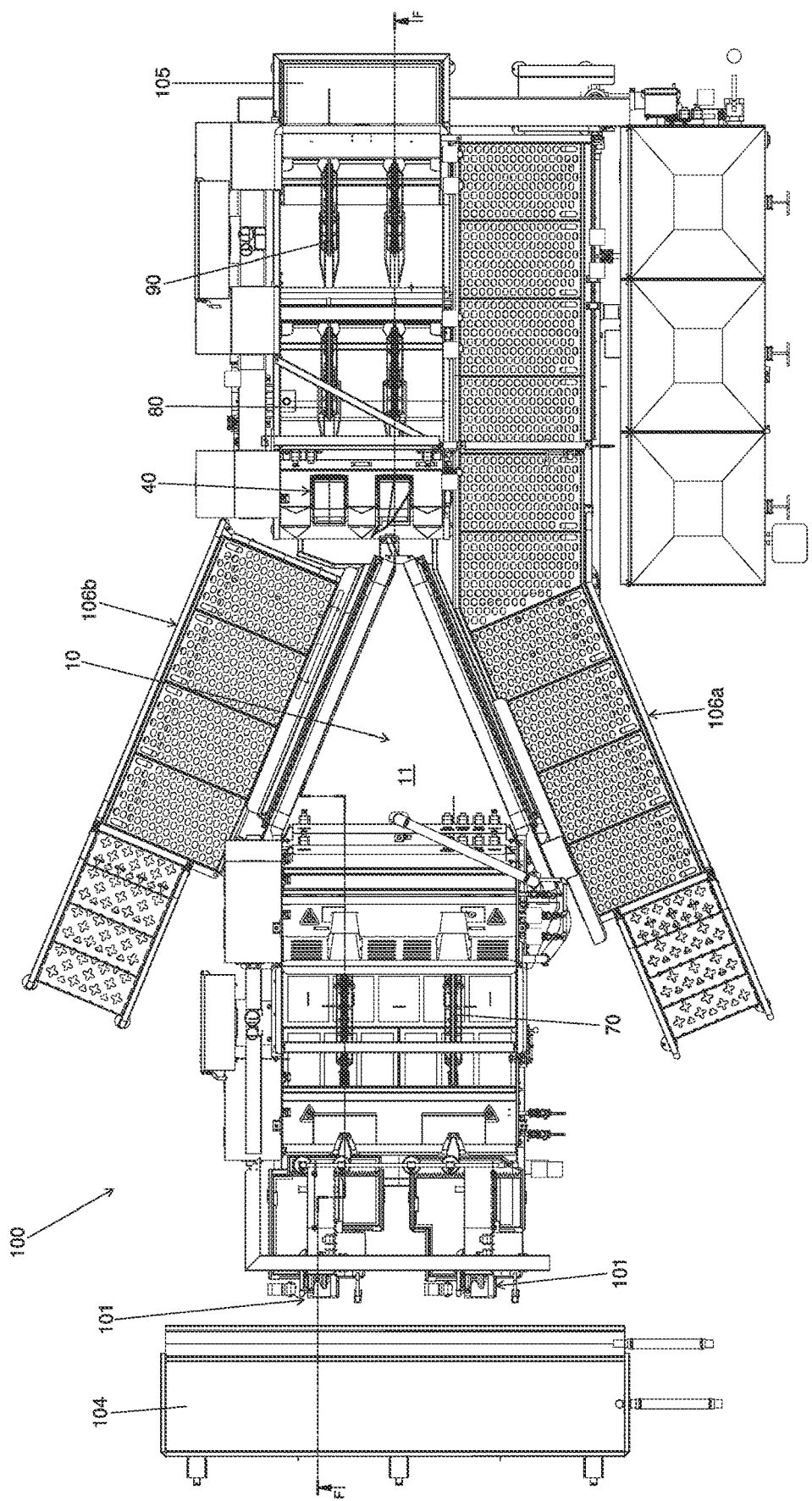
FIG. 16 shows a top view of the processing line.
Figure 17:
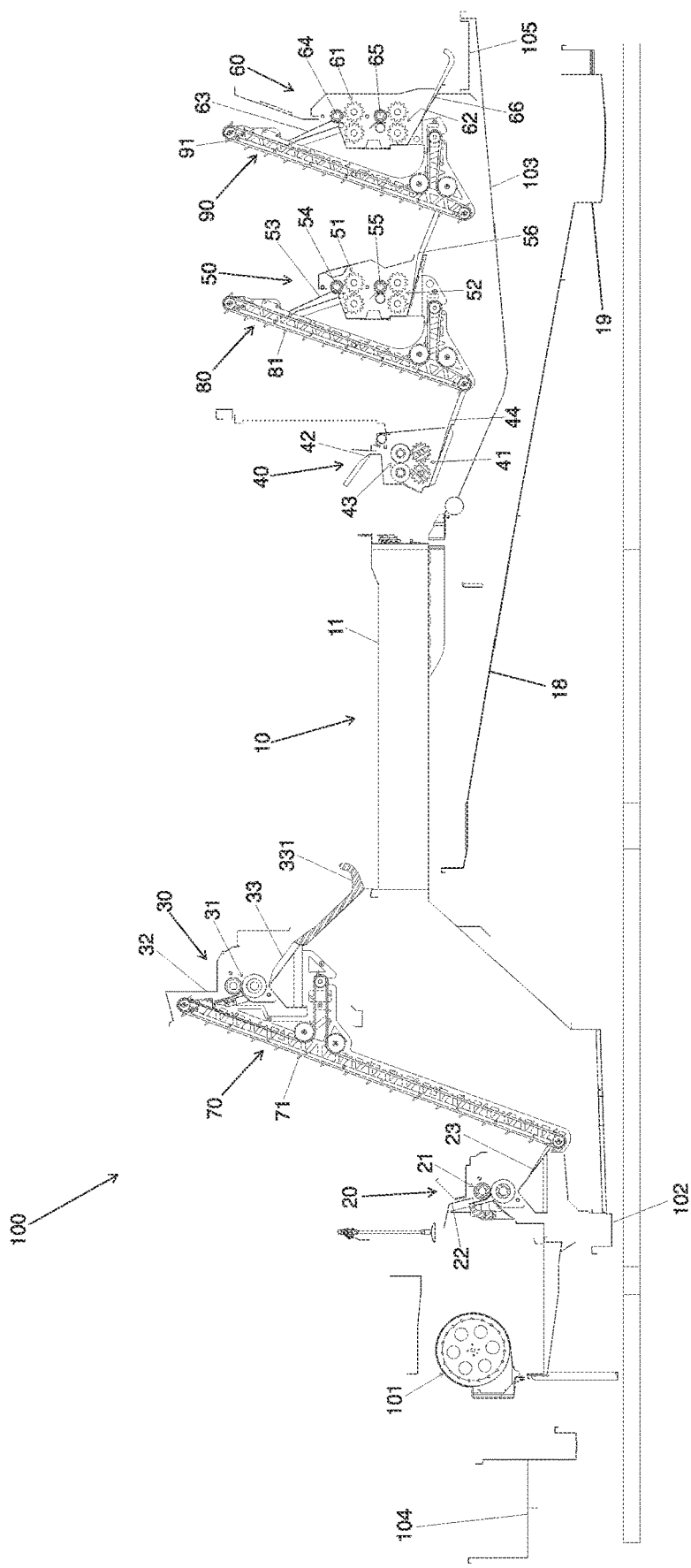
FIG. 17 shows a sectional view according to the "F-F" cutting plane indicated in FIG. 16.

Preferably, as can be seen in FIGS. 15 to 17, the small intestine processing line (100) comprises a lower stool removal device (20) followed by an upper stool removal device (30), which has means to feed small intestines to the tank (11) of the eversion device (10).

Preferably, the processing line (100) comprises at least one first elevator device (70) arranged between the lower stool removal device (20) and the upper stool removal device (30). In the embodiment shown, the first elevator device (70) is a chain conveyor type having a plurality of hooks (71).

In the embodiment shown, the lower stool removal device (20) comprises an inlet (22) that directs the small intestine to a pair of rollers (21) cooperating with each other, and an outlet gutter (23) that directs the small intestine to the first elevator device (70).

In the embodiment shown, the upper stool removal device (30) comprises an inlet (32) which receives small intestines from the first elevator device (70) and directs the small intestines to a pair of rollers (31) cooperating with each other. Preferably, the means of the upper stool removal device (30) to feed small intestines into the tank (11) comprise an outlet gutter (33) that extends to a hook (331) arranged over the tank (11) of the eversion device (10). Thus, after passing through the upper stool removal device (30), the small intestines are guided to the water tank (11) of the eversion device (10) by the outlet gutter (33) and the hook (331). The pair of rollers (21, 31) of each stool removal device (20, 30) is moved by a respective conventional drive system, known in the state of the art.

Preferably, the processing line (100) comprises a first mucosa removal device (40) having at least one pair of first scraper rollers (41) cooperating with each other, followed by a second mucosa removal device (50) having at least one pair of second scraper rollers (51, 52) cooperating with each other, followed by a third mucosa removal device (60) having at least one pair of third scraper rollers (61, 62) cooperating with each other.

Preferably, the processing line (100) comprises at least one second elevator device (80) arranged between the first mucosa removal device (40) and the second mucosa removal device (50), and at least one third elevator device (90) arranged between the second mucosa removal device (50) and the third mucosa removal device (60). In the embodiment shown, the second elevator device (80) and the third elevator device (90) are chain conveyor type, each elevator device (80, 90) having a respective plurality of hooks (81, 91).

In the embodiment shown, the first mucosa removal device (40) comprises a pair of first scraper rollers (41) cooperating with each other. In addition, the first mucosa removal device (40) comprises an inlet (42) that directs the small intestine to a pair of pulling rollers (43) disposed above the pair of first scraper rollers (41), and an outlet gutter (44) which directs the small intestine to the second elevator device (80).

Preferably, the second mucosa removal device (50) comprises a pair of upper scraper rollers (51) followed by a pair of lower scraper rollers (52). Preferably, the third mucosa removal device (60) comprises a pair of upper scraper rollers (61) followed by a pair of lower scraper rollers (62).

In the embodiment shown, the second mucosa removal device (50) comprises an inlet gutter (53) which receives the small intestine from the second elevator device (80) and directs said small intestine to an upper pulling roller (54) located above the pair of the upper scraper rollers (51). In addition, the second mucosa removal device (50) comprises a lower pulling roller (55) located between the pair of upper scraper rollers (51) and the pair of lower scraper rollers (52), and an outlet gutter (56) which directs the small intestine to the third elevator device (90). Each pulling roller (54, 55) of the second mucosa removal device (50) is cooperative with a respective cylindrical tubular bar positioned statically.

In the embodiment shown, the third mucosa removal device (60) comprises an inlet gutter (63), which receives the small intestine from the third elevator device (90) and directs said small intestine to an upper pulling roller (64) located above the pair of upper scraper rollers (61). In addition, the third mucosa removal device (60) comprises a lower pulling roller (65) located between the pair of upper scraper rollers (61) and the pair of lower scraper rollers (62), and an outlet gutter (66), which directs the small intestine to an outlet tray (105). Each pulling roller (64, 65) of the third mucosa removal device (60) is cooperative with a respective cylindrical tubular bar positioned statically. Preferably, the lower gutter (18) of the water tank (11) of the eversion device (10) extends under the mucosa removal devices (40, 50, 60), which, advantageously, contributes to obtaining a compact processing line (100) in length.

The scraper rollers (41, 51, 52, 61, 62) of each mucosa removal device (40, 50, 60) are moved by a respective conventional drive system, known in the state of the art. In addition, the pulling rollers (43, 54, 55, 64, 65) of each mucosa removal device (40, 50, 60) are moved by a respective conventional drive system, known in the state of the art.

In addition, the processing line (100) comprises cleaning devices that eject water into the stool removal devices (20, 30) and mucosa removal devices (40, 50, 60), in order to assist in removing the stool and the mucosa, and clean said removal devices (20, 30, 40, 50, 60). In addition, the processing line (100) comprises means for collecting the stool, which is guided to a stool collection gutter (102), and means for collecting the mucosa, which is guided to a mucosa collection gutter (103). The processing line (100) further comprises an inlet tray (104) and at least one pulling device (101) disposed between the inlet tray (104) and the lower stool removal device (20). In addition, the processing line (100) comprises platforms (106a, 106b), each one positioned in front of the respective conveyor assembly (12a, 12b) of the eversion device (10), in order to allow access to the operators of the eversion device (10).

The small intestine processing steps carried out in the processing line (100) are described below.

Initially, the small intestine is attached to a viscera package through a membrane called the mesentery, said viscera package being positioned in the inlet tray (104). The first step is the separation of the small intestine from the viscera package. This step is performed by an operator with the aid of the pulling device (101), which pulls the small intestine, while the operator cuts the mesentery with a cutting device, in order to continuously separate the small intestine in the direction to get it out of the viscera pack.

Then, another operator, positioned after the pulling device (101), inserts the small intestine into the inlet (22) of the lower stool removal device (20). The pair of rollers (21) of the lower stool removal device (20) compresses the small intestine in order to remove the stool present inside it. Subsequently, the small intestine is directed to the first elevator device (70) and moved to the inlet (32) of the upper stool removal device (30). The pair of rollers (31) of the upper stool removal device (30) compresses the small intestine in order to complement the removal of stool present in its interior, in addition to pulling the small intestine towards the outlet gutter (33). After passing through the pair of rollers (31) of the upper stool removal device (30), the small intestine slides on the outlet gutter (33) up to the hook (331). It is noted that a central portion of the small intestine remains supported by the hook (331), while the rest of the small intestine remains submerged in the water tank (11) of the eversion device (10). In the eversion device (10), at least one operator performs the eversion procedure, as previously described, and then inserts the everted small intestine into the inlet (42) of the first mucosa removal device (40).

The next steps of small intestine processing carried out on the processing line (100) are automatic. After passing through the first mucosa removal device (40), the small intestine is moved by the second elevator device (80) to the second mucosa removal device (50), and subsequently moved by the third elevator device (90) to the third mucosal removal device (60), which finally discharges the small intestine into the outlet tray (105). The pulling rollers (43, 54, 55, 64, 65) pull the small intestine to advance in the processing line (100), while the scraper rollers (41, 51, 52, 61, 62) scrape the mucosa adhered to the wall of the everted small intestine, in order to remove the mucosa and give rise to a mucosa-free casing. The removed mucosa is guided to the mucosa collection gutter (103).

Advantageously, the fact that the processing line (100) has a mucosa removal device (40, 50, 60) positioned only after the eversion device (10) contributes to the collection of a greater amount of useful mucosa, which can be used as a raw material in other industries, such as the pharmaceutical industry. Comparatively, in a prior art processing line, a large part of the mucosa removed by the primary mucosa removal device is discarded together with the water of the tank associated with said primary mucosal removal device, in a step prior to the eversion procedure.

Preferably, the processing line (100) is configured in a double way, that is, each stool removal device (20, 30) and each mucosa removal device (40, 50, 60) has a width sufficient to process at least two small intestines simultaneously, next to each other. In this sense, preferably, the processing line (100) comprises a pair of pulling devices (101) adjacent to each other, as well as a pair of respective elevator devices (70, 80, 90) adjacent to each other. This configuration is compatible with an eversion device (10) configured with two conveyor assemblies (12a, 12b). Alternatively, the processing line (100) can be configured in a simple way, which could have an eversion device (10) configured with a single conveyor assembly (12a, 12b).

The preferred or alternate embodiments described herein are not intended to limit the invention to the structural forms, and constructive variations may be equivalent without, however, departing from the scope of protection of the invention.

The invention claimed is:

1. An eversion device for everting small intestine, the eversion device comprising a water tank formed by walls, including a first side wall and a second side wall,
wherein the eversion device comprises at least one conveyor assembly arranged in one of the side walls of the tank, said conveyor assembly configured to transport at least one small intestine along said side wall, and the tank configured to overflow water over at least one part of an upper edge of the side wall that receives the conveyor assembly.

2. The eversion device according to claim 1, wherein the eversion device comprises a first conveyor assembly arranged in the first side wall of the tank and a second conveyor assembly arranged in the second side wall of the tank.

3. The eversion device according to claim 1, wherein each conveyor assembly comprises a respective plurality of pins spaced apart, said pins being movable along the respective side wall of the tank.

4. The eversion device according to claim 3, wherein each conveyor assembly comprises a roller chain having a transport portion and a return portion, said roller chain having a plurality of supports, each support receiving at least one pin.

5. The eversion device according to claim 1, wherein the tank has a triangular shape, including a base wall cooperating with the side walls, said side walls converging to a vertex.

6. The eversion device according to claim 1, wherein each conveyor assembly is pivotable in relation to the respective side wall of the tank by means of a respective pivoting pin.

7. The eversion device according to claim 1, wherein the eversion device comprises a lower gutter arranged below the tank, the lower gutter extended to a lower water tank.

8. The eversion device according to claim 1, wherein at least one of the side walls of the water tank comprises a water collection gutter extended along said side wall.

9. A small intestine processing line wherein comprising an eversion device as defined in claim 1 the processing line further comprises at least one stool removal device having means to feed small intestines to the tank of the eversion device, and at least one mucosa removal device arranged posteriorly to the tank of the eversion device.

10. The processing line according to claim 9, wherein the processing line comprises a lower stool removal device followed by an upper stool removal device, which has the means to feed small intestines to the tank of the eversion device.

11. The processing line according to claim 9, wherein the means to feed small intestines comprise an outlet gutter that extends to a hook arranged over the tank of the eversion device.

12. The processing line according to claim 9, wherein the processing line comprises a first mucosa removal device having at least one pair of first scraper rollers cooperating with each other, followed by a second mucosa removal device having at least one pair of second scraper rollers cooperating with each other, followed by a third mucosa removal device having at least one pair of third scraper rollers cooperating with each other.

13. The processing line according to claim 12, wherein the second mucosa removal device comprises a pair of upper scraper rollers followed by a pair of lower scraper rollers and/or the third mucosa removal device comprises a pair of upper scraper rollers followed by a pair of lower scraper rollers.

14. The processing line according to claim 10, wherein the processing line comprises at least one first elevator device arranged between the lower stool removal device and the upper stool removal device.

15. The processing line according to claim 12, wherein the processing line comprises at least one second elevator device arranged between the first mucosa removal device and the second mucosa removal device, and at least one third elevator device arranged between the second mucosa removal device and the third mucosa removal device.

* * * * *